US012705167B2

United States Patent

(12) United States Patent
Ibrahim et al.

(10) Patent No.: US 12,705,167 B2
(45) Date of Patent: Aug. 11, 2026

(54) OFFLOADING QUANTIZATION OF DIRECTIONAL BLOCKED DATA FORMATS TO NEAR-MEMORY UNITS

(71) Applicant: Advanced Micro Devices, Inc., Santa Clara, CA (US)

(72) Inventors: Mohamed Assem Abd ElMohsen Ibrahim, Santa Clara, CA (US); Shaizeen Dilawarhusen Aga, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/620,075

(22) Filed: Mar. 28, 2024

(65) Prior Publication Data

US 2025/0307133 A1 Oct. 2, 2025

(51) Int. Cl.
*G06F 12/02* (2006.01)
*G06N 3/0495* (2023.01)

(52) U.S. Cl.
CPC ....... *G06F 12/0223* (2013.01); *G06N 3/0495* (2023.01)

(58) Field of Classification Search
CPC ...... G06F 12/00; G06F 12/0223; G06F 12/02; G06F 2/0207; G06N 3/0495; G06N 3/04
See application file for complete search history.

(56) References Cited

U.S. PATENT DOCUMENTS 5,517,666 A * 5/1996 Ohtani ................ G06F 15/8092 711/100
10,483,978 B1 * 11/2019 Finkbeiner ............. G11C 16/26
2007/0186082 A1 * 8/2007 Prokopenko ............ G06F 7/483 712/221
2019/0042244 A1 * 2/2019 Henry ................. G06F 9/30014
2020/0184001 A1 * 6/2020 Gu ...................... G06F 12/0207
2021/0182021 A1 * 6/2021 Wang ...................... G06F 7/485
2021/0208879 A1 * 7/2021 Song ..................... G06F 7/5443
(Continued)

FOREIGN PATENT DOCUMENTS

WO WO-2022040230 A1 * 2/2022 ......... G06F 9/44505
WO WO-2022212107 A1 * 10/2022 ............... G06N 3/04

OTHER PUBLICATIONS

D. Kim et al., "An Overview of Processing-in-Memory Circuits for Artificial Intelligence and Machine Learning," in IEEE Journal on Emerging and Selected Topics in Circuits and Systems, vol. 12, No. 2, pp. 338-353, Jun. 2022.*
(Continued)

*Primary Examiner* — Pierre Michel Bataille
(74) *Attorney, Agent, or Firm* — FIG. 1 Patents

(57) ABSTRACT

Offloading quantization of directional blocked data formats to near-memory units is described. In one or more implementations, a system includes a processing-in-memory memory circuit configured to store data. The system can also include a memory controller circuit configured to map the data to the processing-in-memory memory circuit. The system can also include a processing-in-memory arithmetic logic unit configured to quantize the data from a scalar format to a directional blocked data format. The scalar format can be or can include a scalar format such as BFloat 16. The directional blocked data format can be or can include a microscaling format.

20 Claims, 11 Drawing Sheets

(56) References Cited

U.S. PATENT DOCUMENTS

| | | | | |
|---|---|---|---|---|
| 2021/0287431 | A1* | 9/2021 | Woop | G06T 17/10 |
| 2021/0329267 | A1* | 10/2021 | Kianfar | H04N 19/124 |
| 2022/0206869 | A1* | 6/2022 | Ramachandran | G06F 3/0673 |
| 2022/0327656 | A1* | 10/2022 | Mellempudi | G06T 1/20 |
| 2023/0024670 | A1* | 1/2023 | Abts | G06F 15/80 |
| 2024/0036820 | A1* | 2/2024 | Kang | G06F 7/48 |
| 2024/0403600 | A1* | 12/2024 | Kwon | G06N 3/042 |

OTHER PUBLICATIONS

J. Ahn, S. Yoo, O. Mutlu and K. Choi, "PIM-enabled instructions: A low-overhead, locality aware processing-in-memory architecture," 2015 ACM/IEEE 42nd Annual International Symposium on Computer Architecture (ISCA), Portland, OR, USA, 2015, pp. 336-348.*

Lee, Sukhan , et al., "Hardware Architecture and Software Stack for PIM Based on Commercial DRAM Technology : Industrial Product", ACM/IEEE 48th Annual International Symposium on Computer Architecture (ISCA) [retrieved Jun. 22, 2023]. Retrieved from the Internet <https://docplayer.net/227317779-Hardware-architecture-and-software-stack-for-pim-based-on-commercial-dram-technology.html>., Jun. 2021, 14 Pages.

Rouhani, Bita Darvish, et al., "With Shared Microexponents, A Little Shifting Goes a Long Way", ISCA '23: Proceedings of the 50th Annual International Symposium on Computer Architecture [Nov. 6, 2023]. Retrieved from the Internet <https://arxiv.org/pdf/2302.08007.pdf>, Feb. 16, 2023, 13 pages.

* cited by examiner

1002
Map unquantized data to the same PIM ALU

1004
Process multiple independent tiles in different PIM ALUs

1006
Perform strided mapping to map input elements of the same tile to the same SIMD lane 1008
Spread the input tile over banks that share the same PIM ALU 1010
Pack input elements from independent tiles in the same DRAM word

OFFLOADING QUANTIZATION OF DIRECTIONAL BLOCKED DATA FORMATS TO NEAR-MEMORY UNITS

BACKGROUND

Conventional computer systems implement a central processing unit, or CPU, and memory as separate components. The CPU performs the processing, and the memory stores the data. When the CPU needs to process data, the CPU retrieves the data from the memory, processes the data, and then sends the data back to the memory for storage. This back-and-forth movement of data between the CPU and memory can create a bottleneck, especially with data-intensive tasks, slowing down overall system performance.

Processing-in-memory, or PIM, is a computational architecture that integrates processing capabilities directly within a memory chip. PIM addresses the aforementioned bottleneck by placing processing units, often in the form of simple processors or logic functions, inside the memory itself. This implementation allows data to be processed where the data is stored, significantly reducing the need to move large amounts of data between the memory and the CPU. As a result, PIM can offer faster data processing, lower latency, and reduced energy consumption, making it particularly advantageous for applications like machine learning, artificial intelligence, and large-scale data analytics, where large datasets are common.

DETAILED DESCRIPTION

Overview

Figure 1:
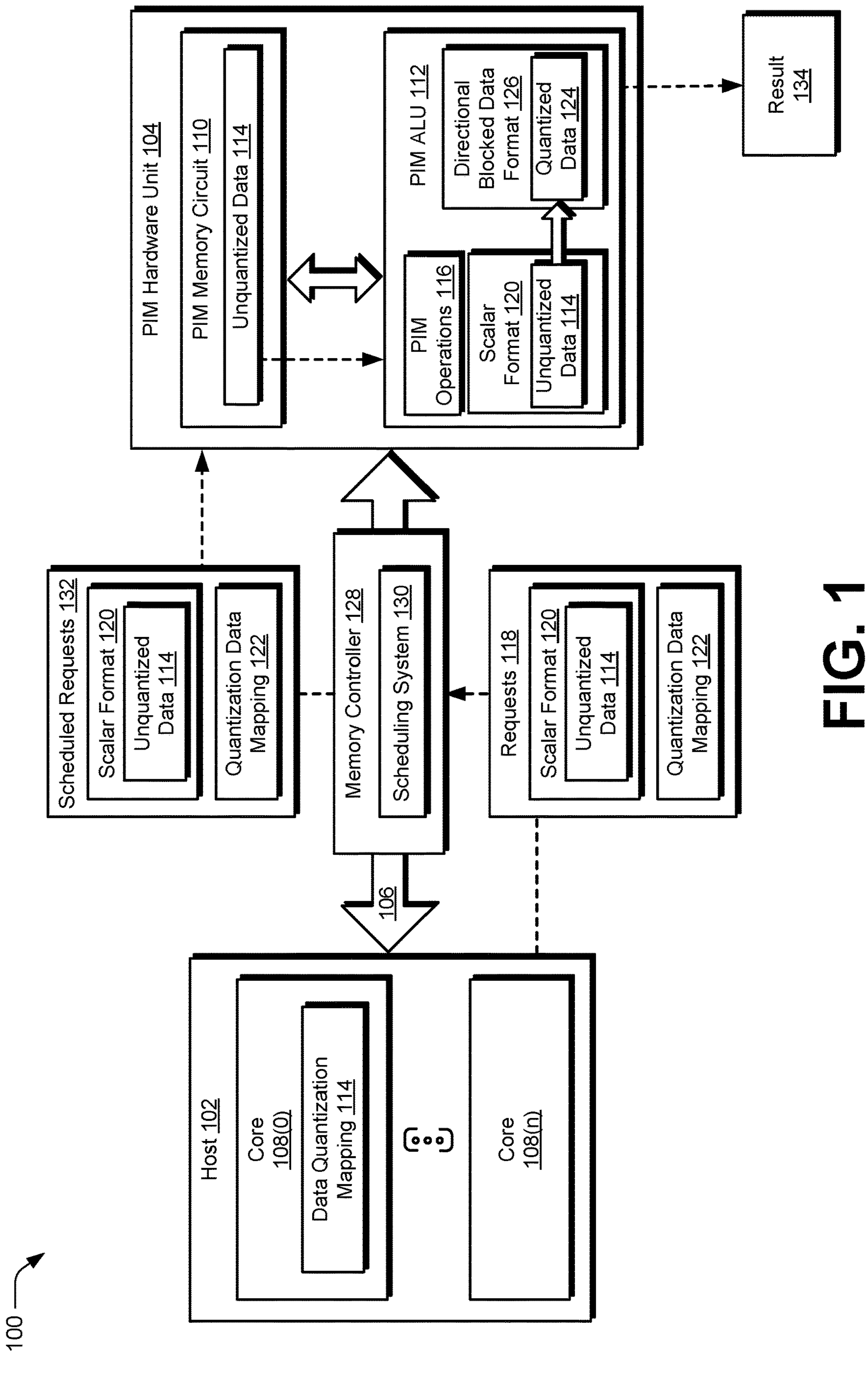
FIG. 1 depicts a non-limiting example system having a host with at least one processor core, a memory controller, and processing-in-memory hardware unit configured to quantize data in a directional blocked data format.

In machine learning, developing and operating advanced models like generative pre-trained transformers is a resource-intensive task that demands considerable computing power and a large amount of memory. However, a solution called quantization can make managing these models more feasible, particularly on devices with limited capabilities. Quantization works by simplifying how models handle data, turning complex numerical information into a more straightforward format. This reduces the memory needed and also accelerates the operations of the model, enhancing efficiency and cost-effectiveness. Quantization can be further improved by leveraging processing-in-memory (PIM) technology, which allows data to be processed where the data is stored, significantly reducing the need to move large amounts of data between the memory and the processor.

Additionally, employing mixed precision techniques of high precision and low precision data formats allows these models to blend simple and intricate data formats within a single training phase of a machine learning model, enhancing performance without compromising on accuracy. This means that for some operations, the models use a less detailed format for faster processing, while still maintaining detailed versions for precision. The introduction of microscaling formats provides further improvements by segmenting data into blocks with common features for more streamlined processing. Nonetheless, these techniques introduce new challenges, such as increased memory demands and the necessity for complex calculations to be efficiently executed with PIM technology. The techniques described herein address these issues by proposing smarter data organization and processing strategies, aiming to maximize the benefits of PIM and further diminish the load on memory and processing power, making advanced machine learning more accessible and effective.

The disclosed techniques shift the process of quantization—a process that simplifies data to make models run faster—closer to where data is stored. This strategy makes the process quicker and smoother on devices designed with PIM technology. Specifically, the disclosed techniques address the aforementioned challenges making quantization on PIM devices not just possible but efficient. These techniques reduce the computational effort PIM devices need to transform basic numerical data into a format used for block-based processing, like a microscaling format. By employing the disclosed techniques, complex machine learning models can run faster and more efficiently.

State-of-the-art machine learning models, such as generative pre-trained transformers, involve high training and deployment costs in terms of compute, data movement, capacity, and so on. Quantization in context of machine learning is the process of converting floating point numbers to lower precision formats to reduce the memory footprint of a machine learning model and reduce the computational requirements for more efficient deployment of the machine learning model on resource-constrained devices. Quantization addresses the aforementioned high training and deployment costs because low-precision data formats reduce the capacity and the data movement overheads, and therefore improve overall performance. Given the low operation-to-byte ratio of quantization, quantization can avail acceleration by harnessing the memory bandwidth boost provided PIM technology.

Mixed precision techniques in machine learning allow for the use of different data formats within a single training session, which can lead to improvements in efficiency and performance. By utilizing these techniques, the amount of data movement and memory required for training can be significantly reduced. This is partly achieved by storing weights, activations, and gradients in low-precision formats, which speeds up arithmetic operations due to higher throughput computation. To ensure that the accuracy of training is not compromised by the use of low-precision formats, a high-precision copy of the weights is kept and updated during optimization steps. However, this method of maintaining multiple copies of weights, including both high-precision and low-precision versions, places considerable demand on memory capacity, a critical constraint in training large-scale machine learning models.

Furthermore, the introduction of emerging directional blocked data formats, such as microscaling formats, necessitates the quantization of tensors along specific dimensions to leverage hardware benefits. Microscaling formats combine a per-block scaling factor with narrow floating-point and integer types for individual elements within a block, i.e., a collection or group of individual data elements that share a common scaling factor. The quantization of tensors involves maintaining two low-precision copies of weights for the forward and backward passes, further increasing the memory utilization. These new data formats also add extra quantization operations that could potentially impact training throughput. Addressing these challenges, the described techniques focus on efficiently performing quantization in PIM implementations. Specifically, the described techniques convert existing scalar data formats to new directional blocked data formats.

One example of a scalar data format is BFloat16, which allocates 1 bit for the sign, 8 bits for the exponent, and 7 bits for the mantissa. This configuration allows BFloat16 to have the same range as 32-bit floating-point numbers but with reduced precision. A directional data format such a microscaling format that represent data by combining a per-block scaling factor with narrow floating-point and integer types for the individual elements within a block. This approach allows for the compact representation of data with varying scales and precisions within a dataset or computational context. By using a shared scaling factor for a group of elements (i.e., a block) and employing narrower data types for these elements, MX formats optimize memory usage and computational efficiency, particularly in applications requiring the handling of large volumes of data with diverse numeric ranges, such as in machine learning. The shared scaling factor helps to maintain the overall precision and dynamic range of the data, while the use of narrow data types reduces the storage and computation overhead.

By converting a scalar data format to a directional blocked data format, input tensors (i.e., input as a multi-dimensional array of data) are broken down into blocks and a two-level scale-factor quantization process is applied. This involves computing a shared scale factor from a reduction function across elements, followed by deducing a second scale factor for each pair of input elements and adjusting the mantissa bits accordingly. This approach aims to optimize the quantization process in the context of large-scale, state-of-the-art machine learning model training with emerging PIM technologies.

Efficient implementations of quantization in memory-bound environments make it a suitable candidate for PIM acceleration, considering the substantial memory bandwidth advantage PIM has over processing units, such as graphics processing units (GPUs) and central processing units (CPUs). However, current commercial PIM implementations face challenges in effectively accelerating quantization, particularly for directional blocked data formats. One key issue is the naive data-mapping and orchestration strategy. In a conventional setup, a PIM unit with a Single Instruction, Multiple Data (SIMD) Arithmetic Logic Unit (ALU) is implemented, where the SIMD width corresponds to the output width of a dynamic random-access memory (DRAM) bank. For example, a 256-bit wide SIMD ALU can process 16 elements of 16-bit each in a single DRAM word. A naive approach would distribute input tensor elements across SIMD ALUs to take advantage of parallelism. This works efficiently if elements of the same block are in the same bank or banks that share the same SIMD ALU, allowing per-dimension quantization without needing inter-bank communication. However, if this condition is not met, frequent inter-bank communication becomes necessary, typically via the host processing unit (e.g., GPU or CPU), negating the potential benefits of PIM. Additionally, the requirement to quantize tensors along the reduction dimension in emerging formats means that computation involves both row and column elements in 2D tensors, which, if not properly mapped, leads to more inter-bank processing unit communication, further limiting PIM's advantages. Moreover, calculating the scale-factor (both level-1 and level-2) requires interaction between elements within the same block. A naive data mapping that does not account for this interaction can necessitate cross-SIMD lane computations, a capability often lacking in current commercial PIM implementations. This leads to the use of inter-lane PIM-SHIFT commands for element alignment, which can adversely impact the efficiency of PIM acceleration.

The quantization process in emerging directional data formats, such as the MX-like formats, involves complex bit-level operations that can be a bottleneck in PIM implementations. Specifically, the deducing of mantissa bits for these formats requires intra-lane PIM-SHIFT operations, where the shift amount varies for each input element based on the level-2 scale-factor and individual element's exponent value. This necessitates a sequence of three distinct PIM commands. Initially, a PIM-COMPARE command is used to determine which lanes (or elements) need shifting and to create a mask for excluding lanes that do not require shifting. This is followed by a single-bit intra-lane PIM-SHIFT command, applied only to the targeted lanes using the previously generated mask. The process concludes with decrementing the shift amount for all targeted lanes. Simplifying this process by reducing the number of PIM commands needed for each intra-lane shift from three to one significantly reduces the quantization time on PIM. However, these challenges are not limited to MX formats alone and are exacerbated in directional blocked data formats with varying block sizes or in higher-dimensional (e.g., 2D, 3D) blocked data formats, as opposed to the simpler 1D blocked MX formats.

Offloading quantization of directional blocked data formats to near-memory units is described. The described techniques implement methodologies and mechanisms to enable efficient acceleration of quantization on PIM hardware by addressing the challenges discussed above. In particular, a methodology is described that enables data mapping for quantization to be able to exploit the benefits provided by emerging PIM commercial implementations. In addition, a methodology and apparatus are described to lower PIM compute operations needed to execute quantization of data in a scalar format (e.g., BF16) to data in a directional blocked data format (e.g., an MX format).

In some aspects, the techniques described herein relate to a system including a processing-in-memory memory circuit configured to store data, a memory controller circuit configured to map the data to the processing-in-memory memory circuit, and a processing-in-memory arithmetic logic unit configured to quantize the data from a scalar format to a directional blocked data format.

In some aspects, the techniques described herein relate to a system, wherein the data includes unquantized data or previously quantized data.

In some aspects, the techniques described herein relate to a system, wherein the processing-in-memory memory circuit includes one or more memory banks shared by one or more processing-in-memory arithmetic logic units, the one or more processing-in-memory arithmetic logic units including the processing-in-memory arithmetic logic unit.

In some aspects, the techniques described herein relate to a system, wherein the memory controller circuit is configured to spread the data over the one or more memory banks.

In some aspects, the techniques described herein relate to a system, wherein the scalar format is BF16 and the directional blocked data format is a microscaling format.

In some aspects, the techniques described herein relate to a system, wherein the data is configured as an input tensor including a plurality of tiles.

In some aspects, the techniques described herein relate to a system, further including a plurality of processing-in-memory arithmetic logic units including the processing-in-memory arithmetic logic unit, and one or more processing-in-memory arithmetic logic units of the plurality of processing-in-memory arithmetic logic units are configured to process one or more tiles of the plurality of tiles included in the input tensor.

In some aspects, the techniques described herein relate to a system, wherein the memory controller circuit is configured to map input elements of a specific tile of the plurality of tiles to a specific single instruction, multiple data lane of the processing-in-memory arithmetic logic unit or a specific column of a dynamic random-access memory word of a memory bank of the processing-in-memory memory circuit.

In some aspects, the techniques described herein relate to a system, wherein the memory controller circuit is further configured to pack multiple tiles of the plurality of tiles into one or more dynamic random-access memory words within one or more memory banks shared by one or more processing-in-memory arithmetic logic units of a plurality of processing-in-memory arithmetic logic units.

In some aspects, the techniques described herein relate to a system, further including a counter-based conditional shift unit configured to lower a number of processing-in-memory commands to perform intra-lane, bit-level, shifts per tile of the plurality of tiles of the input tensor.

In some aspects, the techniques described herein relate to a system including a counter-based conditional shift circuit configured to check a shift amount for each lane in an arithmetic logic unit, based on the shift amount for each lane, generate a mask register, using the mask register, calculate a minimum shift amount, update an intra-lane shift command to include the minimum shift amount, and decrement the shift amount for each lane by the minimum shift amount.

In some aspects, the techniques described herein relate to a system, further including the arithmetic logic unit, and wherein the arithmetic logic unit is configured to perform intra-lane shifts when instructed via the intra-lane shift command.

In some aspects, the techniques described herein relate to a system, wherein the counter-based conditional shift circuit is further configured to inform a memory controller circuit that all lanes have been shifted and to instruct the memory controller circuit to stop issuing intra-lane shift commands to the arithmetic logic unit.

In some aspects, the techniques described herein relate to a system, further including the memory controller circuit.

In some aspects, the techniques described herein relate to a method including mapping data to a memory circuit, processing multiple independent tiles in parallel in different arithmetic logic units, perform strided mapping to align elements of a specific tile to a specific lane within a specific arithmetic logic unit, spreading the specific tile over multiple memory banks of the memory circuit that share the specific arithmetic logic unit, and packing elements from the multiple independent tiles in one or more dynamic random-access memory words.

In some aspects, the techniques described herein relate to a method, wherein the data is formatted in a scalar format.

In some aspects, the techniques described herein relate to a method, wherein the scalar format is BF16.

In some aspects, the techniques described herein relate to a method, further including outputting quantized data formatted in a directional blocked data format.

In some aspects, the techniques described herein relate to a method, wherein the directional blocked data format is a microscaling format.

In some aspects, the techniques described herein relate to a method, further including checking a shift amount for each lane in the specific arithmetic logic unit, based on the shift amount for each lane, generating a mask register, using the mask register, calculating a minimum shift amount, updating an intra-lane shift command to include the minimum shift amount, and decrementing the shift amount for each lane by the minimum shift amount.

FIG. 1 is a block diagram of a non-limiting example system 100. The illustrated system 100 includes a host 102 and a PIM hardware unit 104, where the host 102 and the PIM hardware unit 104 are communicatively coupled via a connection/interface 106. In one or more implementations, the host 102 includes at least one core 108. In some implementations, the host 102 includes multiple cores 108. For instance, in the illustrated example, the host 102 is depicted as including core 108(0) and core **108(*n*), where n represents any integer. The PIM hardware unit 104 includes a PIM memory circuit 110 and a PIM arithmetic logic unit (ALU) 112**.

In accordance with the described techniques, the host 102 and the PIM hardware unit 104 are coupled to one another via a wired or wireless connection, which is depicted in the illustrated example of FIG. 1 as the connection/interface 106. Example wired connections include, but are not limited to, buses (e.g., a data bus), interconnects, traces, and planes. Examples of devices in which the system 100 is implemented include, but are not limited to, supercomputers and/or computer clusters of high-performance computing (HPC) environments, servers, personal computers, laptops, desktops, game consoles, set top boxes, tablets, smartphones, mobile devices, virtual and/or augmented reality devices, wearables, medical devices, systems-on-chips, and other computing devices or systems.

The host 102 is an electronic circuit that includes one or more cores 108 that perform various operations on and/or using data. Examples of the host 102 include, but are not limited to, a central processing unit (CPU), a graphics processing unit (GPU), a field programmable gate array (FPGA), an accelerated processing unit (APU), and a digital signal processor (DSP). For example, in one or more implementations, a core 108 is a processing unit that reads and executes instructions (e.g., of a program).

In one or more implementations, the PIM hardware unit 104 is a circuit board (e.g., a printed circuit board), on which the PIM memory circuit 110 is mounted and includes the PIM ALU 112. In some variations, one or more integrated circuits of the PIM memory circuit 110 are mounted on the circuit board of the PIM hardware unit 104, and the PIM hardware unit 104 also includes one or more PIM ALUs 112. Examples of the PIM memory circuit 110 include, but are not limited to, a single in-line memory module (SIMM), a dual in-line memory module (DIMM), small outline DIMM (SODIMM), microDIMM, load-reduced DIMM, registered DIMM (R-DIMM), non-volatile DIMM (NVDIMM), high bandwidth memory (HBM), and the like. In one or more implementations, the PIM hardware unit 104 is a single integrated circuit device that incorporates the PIM memory circuit 110 and the PIM ALU 112 on a single chip. In some examples, the PIM hardware unit 104 is composed of multiple chips that implement the PIM memory circuit 110 and the PIM ALU 112 as vertical ("3D") stacks, placed side-by-side on an interposer or substrate, or assembled via a combination of vertical stacking and side-by-side placement.

The PIM memory circuit 110 is a device or system that is used to store information, such as unquantized data 114, for immediate use in a device (e.g., by a core 108 of the host 102 and/or by the PIM ALU 112). The unquantized data 114 is data that has not been processed through quantization, a method where continuous or very high-resolution data is converted into lower resolution. In the unquantized data 114, the values are typically detailed and have not been simplified or approximated into a limited set of values. This type of data often represents the raw, original state of information before any process of digital compression or conversion.

In one or more implementations, the PIM memory circuit 110 corresponds to semiconductor memory where the unquantized data 114 is stored within memory cells on one or more integrated circuits. In at least one example, the PIM memory circuit 110 corresponds to or includes volatile memory, examples of which include random-access memory (RAM), dynamic random-access memory (DRAM), synchronous dynamic random-access memory (SDRAM) (e.g., single data rate (SDR) SDRAM or double data rate (DDR) SDRAM), ferroelectric RAM (FeRAM), resistive RAM (RRAM), a spin-transfer torque magnetic RAM (STT-MRAM), and static random-access memory (SRAM).

Broadly, the PIM hardware unit 104 is a processor (e.g., the PIM ALU 112) and a memory (e.g., the PIM memory circuit 110) combined on the same chip. The PIM ALU 112 is configured to perform PIM operations 116, such as operations performed as part of servicing one or more requests 118 received from the core 108 via the connection/interface 106. In the illustrated example, the requests 118 received from the core 108 include the unquantized data 114 formatted in a scaler format 120 (e.g., BF16 format or the like) along with a quantization data mapping 122. The quantization data mapping 122 instructs the PIM memory circuit 110 where to store the unquantized data 114. In other words, the unquantized data 114 is mapped to a particular portion of the PIM memory circuit 110 in accordance with the quantization data mapping 122. After the unquantized data 114 is mapped, the PIM ALU 112 performs specific PIM operations 116 to quantize the unquantized data 114 in the scalar format 120 into quantized data 124 in a directional blocked data format 126 (e.g., MX format or the like). In other words, "quantize the data" refers to converting data from a first format (e.g., a high precision format such as the scalar format 120) into a second format (e.g., a lower precision format such as the directional blocked data format 126). Although this example uses the unquantized data 114, alternatively the requests 118 received from the core 108 include previously quantized data. For example, in a hypothetical scenario in which input X in FP32 format is quantized to Y in BF16 format, then Y is fed as input to be quantized to a directional blocked data format 126 (e.g., MX format or the like). In this case, input Y is a quantized version of input X.

The PIM ALU 112 is representative of a processor with example processing capabilities ranging from relatively simple to relatively complex, including, for example, performing arithmetic operations, logical operations, bit-shifting operations, comparison operations, and data transport operations. In an example, the PIM ALU 112 processes the requests 118 by executing associated PIM operations 116 using the unquantized data 114 stored in the PIM memory circuit 110.

A request 118 encompasses a process of requesting data (e.g., the quantized data 124) from or sending data (e.g., the unquantized data 114) to the PIM hardware unit 104. The requests 118 are made by a processor or device (e.g., a core 108 of the host 102) to the PIM hardware unit 104 to perform one or more memory operations, such as one or more PIM operations 116, although, in some implementations, the requests 118 also include non-PIM operations (i.e., conventional memory operations) directed to the PIM memory circuit 110 and/or another memory circuit (e.g., conventional DRAM; not shown) that is not associated with the PIM hardware unit 104.

The requests 118 include information such as a memory address that specifies a location of at least a portion of the unquantized data 114 to be accessed within the PIM memory circuit 110, a memory operation type (e.g., read or write operation), and control command(s). In the illustrated example, specifically, the information also includes the quantization data mapping 122 that instruct the PIM memory circuit 110 where to store the unquantized data 114 for processing by the PIM ALU 112.

The PIM operations 116 are specific actions performed by the PIM ALU 112, such as actions to implement the computation instructions to quantize the unquantized data 114 stored in the PIM memory circuit 110 in accordance with the quantization data mapping 122. Generally, the PIM operations 116 significantly improve performance of the system 100 by reducing data movement, minimizing latency, and taking advantage of the parallelism and proximity of data processing within the PIM hardware unit 104. The PIM operations 116 are particularly beneficial for applications with high memory bandwidth requirements, such as data-intensive analytics, machine learning, artificial intelligence, and scientific simulations.

A memory command is a specific control signal or instruction sent to the PIM hardware unit 104 to perform a particular memory operation. A memory command is a low-level command that directly interacts with a memory controller circuit 128 or the PIM memory circuit 110 to initiate a memory operation. Memory commands are often specific to the memory technology being used, such as DDR memory, where commands like READ, WRITE, PRECHARGE, and ACTIVATE are used to control access to the DDR memory.

PIM architectures contrast with conventional computer architectures that obtain data from memory, communicate the data to a remote processing unit (e.g., a core 108 of the host 102), and process the data using the remote processing unit (e.g., using a core 108 of the host 102 rather than the PIM ALU 112). In various scenarios, the data produced by the remote processing unit as a result of processing the obtained data is written back to memory, which involves communicating the produced data over the connection/interface 106 from the remote processing unit to memory. In terms of data communication pathways, the remote processing unit (e.g., a core 108 of the host 102) is further away from the PIM memory circuit 110 than the PIM ALU 112, both physically and topologically. As a result, conventional computer architectures suffer from increased data transfer latency, reduced data communication bandwidth, and increased data communication energy, particularly when the volume of data transferred between the memory and the remote processing unit is large, which can also decrease overall computer performance.

Thus, the PIM ALU 112 enables increased computer performance while reducing data transfer energy as compared to conventional computer architectures that implement remote processing hardware. Further, the PIM ALU 112 alleviates some memory performance and energy bottlenecks by moving one or more memory-intensive computations closer to the PIM memory circuit 110. Although the PIM ALU 112 is illustrated as being disposed within the PIM hardware unit 104, in some examples, the described benefits of using processing-in-memory techniques are realizable through near-memory processing implementations in which the PIM ALU 112 is disposed in closer proximity to the PIM memory circuit 110 (e.g., in terms of data communication pathways) than a core 108 of the host 102.

The system 100 is further depicted as including a memory controller circuit 128 (shown as "memory controller"). The memory controller circuit 128 is a circuit configured to receive the requests 118 from the host 102 (e.g., from a core 108 of the host 102) or elsewhere (e.g., an external system or device). Although depicted in the example system 100 as being implemented separately from the host 102, in some implementations, the memory controller circuit 128 is implemented locally as part of the host 102. The memory controller circuit 128 is further configured to schedule the requests 118 for a plurality of hosts 102, despite being depicted in the illustrated example of FIG. 1 as serving a single host 102. For instance, in an example implementation, the memory controller circuit 128 schedules the requests 118 for a plurality of different hosts 102, where each of the plurality of different hosts 102 include one or more cores 108 that submit the requests 118 to the memory controller circuit 128 for scheduling with the PIM hardware unit 104.

In accordance with one or more implementations, the memory controller circuit 128 is associated with a single channel of the PIM memory circuit 110. For instance, the system 100 is configured to include a plurality of different memory controller circuits 128, one for each of a plurality of channels of the PIM memory circuit 110. The techniques described herein are thus performable using a plurality of different memory controller circuits 128 to schedule the requests 118 for different channels of the PIM memory circuit 110. In some implementations, a single channel in the PIM memory circuit 110 is allocated into multiple pseudo-channels. In such implementations, the memory controller circuit 128 is configured to schedule the requests 118 for different pseudo-channels of a single channel in the PIM memory circuit 110.

As depicted in the illustrated example of FIG. 1, the memory controller circuit 128 includes a scheduling system 130. The scheduling system 130 is representative of a digital circuit configured to schedule the requests 118 for execution in a manner that optimizes performance of the system 100 (e.g., limits computational resource consumption, decreases latency, and reduces power consumption of the system 100) when measured over execution of the requests 118. The scheduling system 130 includes a request queue (not shown). The request queue is configured to maintain a queue of the requests 118 received at the memory controller circuit 128 from the host 102. In some implementations, the scheduling system 130 includes multiple request queues, such as a PIM request queue for handling PIM-specific requests and a non-PIM request queue for handling non-PIM-specific requests. Alternatively, the memory controller circuit 128 is logically or physically divided into separate memory controllers designed to serve specific types of requests 118, such as a logical or physical memory controller for serving PIM-specific requests and another logical or physical memory controller for serving non-PIM-specific requests. Other variations on this concept are contemplated.

The scheduling system 130 is configured to schedule an order of the requests 118 maintained in the request queue for execution by the PIM ALU 112 (i.e., PIM-specific requests) and/or the host 102 (i.e., non-PIM-specific requests). As depicted in the illustrated example of FIG. 1, the requests 118 selected by the scheduling system 130 from the request queue are represented as scheduled requests 132. In some implementations, the scheduling system 130 selects a single request 118 from the request queue for inclusion in the scheduled requests 132 per clock cycle of the system 100. Alternatively, the scheduling system 130 selects multiple requests 118 from the request queue for inclusion in the scheduled requests 132 per clock cycle. The illustrated scheduled requests 132 include the unquantized data 114 formatted in the scalar format 120 and the quantization data mapping 122 instructions. In some implementations, the scheduled requests 132 additionally include non-PIM-specific requests.

The scheduled requests 132 are transmitted by the memory controller circuit 128 to the PIM ALU 112. Although not shown in the illustrated example, the PIM ALU 112 has, in some implementations, a PIM operation queue configured to store an ordered list of operations, such as the PIM operations 116, scheduled for execution by the PIM ALU 112 using, at least in part, the unquantized data 114 stored in the PIM memory circuit 110. As part of executing a scheduled request 132, the PIM ALU 112 executes the appropriate PIM operations 116 and generates a result 134 that includes, for example, the quantized data 124 in the directional blocked data format 126.

Instructions included in a scheduled request 132 for outputting the result 134 are configurable. For instance, in some implementations, executing a scheduled request 132 causes the PIM ALU 112 to communicate the result 134 to a requesting source, such as the host 102. Alternatively, or additionally, in some implementations, instructions included in the scheduled request 132 cause the PIM ALU 112 to output the result 134 to a storage location in the PIM memory circuit 110 (e.g., to update the unquantized data 114 stored in the PIM memory circuit 110 for subsequent access and/or retrieval by the host 102, and so forth) or elsewhere. Alternatively, or additionally, in some implementations, instructions included in the scheduled request 132 cause the PIM ALU 112 to store the result 134 locally (e.g., in a register of the PIM ALU 112).

Because the PIM ALU 112 executes the scheduled requests 132 on behalf of the host 102, the PIM ALU 112 is configured to execute the scheduled requests 132 with minimal impact on the system 100 (e.g., without invalidating caches of the system 100 or causing traffic on the connection/interface 106). For instance, the PIM ALU 112 executes the scheduled requests 132 on "in the background" with respect to the host 102 and the core 108, which frees up cycles of the host 102 and/or the core 108, reduces memory bus traffic (e.g., reduces traffic on the connection/interface 106), and reduces power consumption relative to performing operations at the host 102 and/or the core 108. Notably, because the PIM ALU 112 is closer to the system memory (e.g., the PIM memory circuit 110) than the core 108 of the host 102 in terms of data communication pathways, processing the unquantized data 114 stored in the PIM memory circuit 110 is generally completable in a shorter amount of time using the PIM ALU 112 than if the evaluation were performed using the core 108 of the host 102. Moreover, in some implementations, multiple PIM ALUs 112 are used to process data concurrently and independently, further alleviating processing tasks from the host 102.

Figure 2:
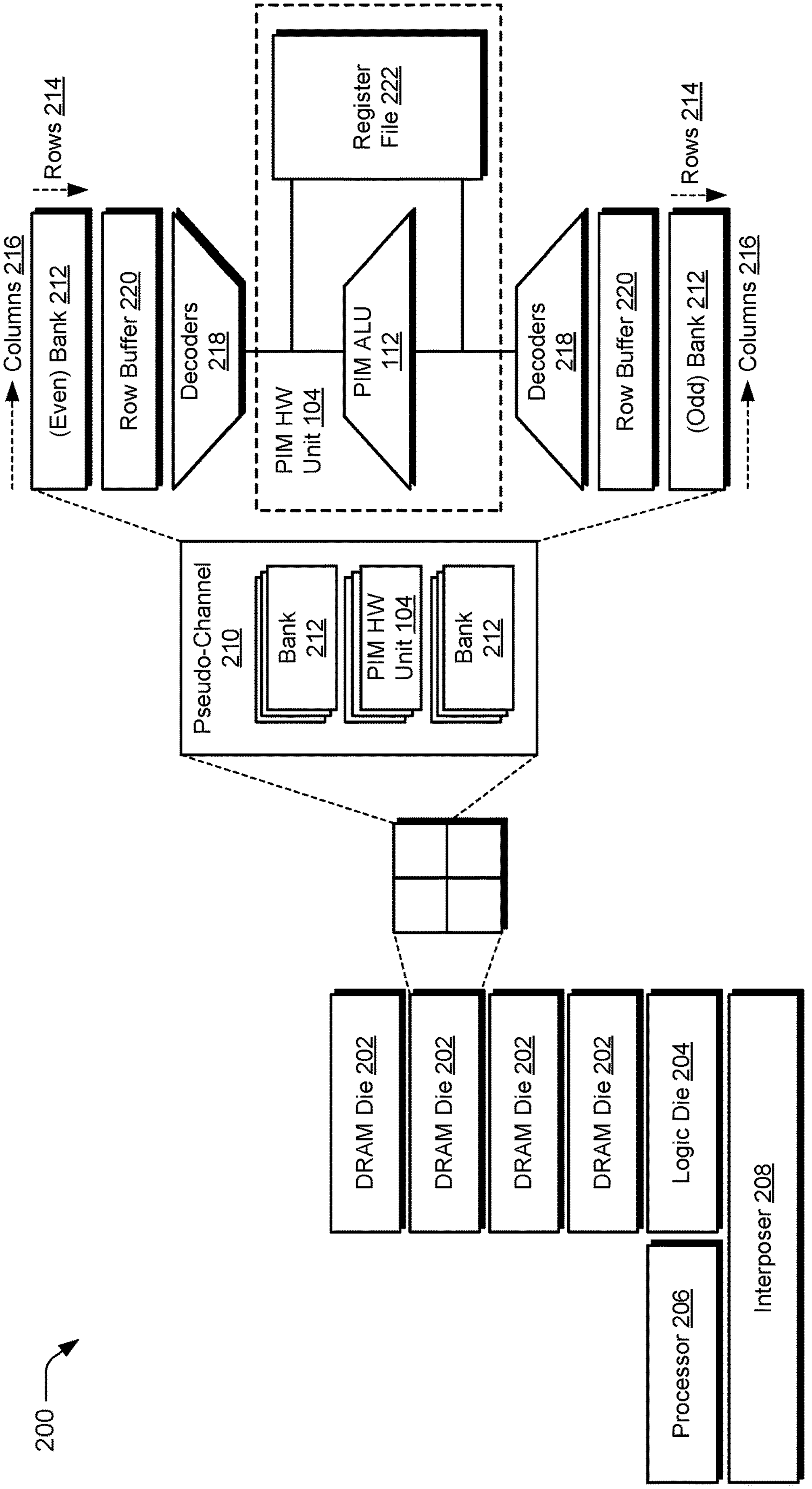
FIG. 2 depicts a non-limiting example processing-in-memory implementation for dynamic random-access memory, such as a high-bandwidth memory.

FIG. 2 depicts a non-limiting example PIM configuration 200 for DRAM-based memory, such as an HBM-based PIM implementation. In the example PIM configuration 200, a plurality of DRAM die 202 (hereafter "DRAM die 202") are stacked and are controlled via a logic die 204 that contains logic circuitry configured to manage and interface with memory cells within the DRAM die 202. In some implementations, the PIM memory circuit 110 includes one or more DRAM die 202. In other implementations, the PIM memory circuit 110 includes one or more DRAM die 202 and the logic die 204. The logic die 204, in some implementations, is or includes the memory controller circuit 128 described above. The logic die 204 is shown in proximity to a processor 206.

In one or more implementations, the processor 206 is or includes the host 102 having one or more cores 108. In some implementations, the processor 206 is or includes a CPU, a GPU, or combined CPU and GPU. The illustrated example depicts the processor 206, the logic die 204, and the DRAM die 202 as being disposed on an interposer 208. The interposer 208 is a physical interface that electrically connects and supports multiple chips in a single assembly (e.g., an SoC), facilitating high-density interconnects and enabling advanced technologies like 2.5D or 3D chip stacking.

Each DRAM die 202 includes one or more pseudo-channels 210. The pseudo-channels 210 are virtual channels within a single physical memory channel. Each pseudo-channel 210 contains multiple banks 212 that share a data bus of the pseudo-channel 210. Each bank 212 is a segment of memory that is accessible independently, allowing for parallel data processing and improved efficiency in memory operations. Further, each bank 212 includes multiple rows 214 and columns 216. The rows 214 and columns 216 are selected via decoders 218 (e.g., a column decoder and a row decoder for each bank 212). The decoders 218 are circuits that decode address signals to select specific one of the columns 216 and the rows 214 within the DRAM die 204, enabling precise access to the desired data location for read or write operations. When a memory request is made, such as to write data to or read data from the bank 212, a row decoder of the decoders 218 selects the appropriate row 214 in the memory array and loads data (e.g., unquantized data 114) from that row 214 into a row buffer 220. Then, a column decoder of the decoders 218 interprets the column part of the memory address to select the specific data within the row buffer 220.

In the illustrated example, each PIM hardware unit 104 includes a PIM ALU 112, such as described above. In one or more implementations, the PIM ALU 112 is or includes a SIMD PIM ALU having a specific bit width (e.g., 256-bit width). The PIM ALU 112 implemented as a SIMD PIM ALU enables processing on multiple lanes in parallel. In the illustrated example, the PIM hardware unit 104 also includes a register file 222. The register file 222 is a collection of high-speed storage locations that temporarily stores data (e.g., the unquantized data 124) for processing. The register file 222 functions as an intermediary, allowing for efficient data transfer and manipulation between the banks 212 and the PIM ALU 112, thereby enhancing the computational speed and reducing latency in data-intensive operations.

To harness performance while managing area overheads, each PIM hardware unit 104 is shared by two banks 212—one even bank and one odd bank. To reduce complexity, the PIM hardware units 104 do not have any instruction fetch capabilities, although in alternative implementations, the PIM hardware units 104 have instruction fetch capabilities. Without instruction fetch capabilities, PIM commands are sent by the processor 206 to the pseudo-channel 210. Each PIM command is then broadcast to all PIM hardware units 104 within the pseudo-channel 210. The PIM hardware units 104 operate in parallel. The PIM hardware units 104 have a bandwidth advantage over the processor 206 (e.g., about 4 to 8 times in some instances). For example, memory accesses performed by the processor 206 to different banks 212 of the pseudo-channel 210 are serialized over the memory interface, and, in contrast, the PIM hardware units 104 are capable of independently accessing the attached banks 212. This bandwidth boost is harnessed to offload bandwidth intensive, low compute-to-byte, computations to the PIM hardware units 104, while keeping compute-bound phases on the processor 206.

Mixed precision training in machine learning is a technique that uses both lower and higher precision numerical formats (like 16-bit and 32-bit floating-point) during the training process, optimizing computational efficiency and memory usage while maintaining model accuracy and speed. Mixed precision training techniques enable the use of different data formats in a single training run. This can reduce data movement and memory requirements. Also, mixed precision training techniques can speed up arithmetic by using high throughput compute. In practice, weights, activations, and gradients are stored in low-precision data formats. However, to prevent the loss of critical information due to the use of low-precision and hence preserve the accuracy of high-precision training, a high-precision copy of the weights is maintained and updated during the optimizer step. Conventionally, two copies of the weights are maintained—a high-precision copy and a low-precision copy. Maintaining multiple copies puts pressure on memory capacity, which is a key limiting factor in training large-scale machine learning models.

Emerging directional blocked data formats (such as MX formats) utilize tensors (i.e., multi-dimensional arrays of data) that are to be quantized along the reduction dimension to attain hardware benefits. This results in maintaining two low-precision copies, one for a forward pass and one for a backward pass. This results in more pressure on the memory capacity of the system. Also, the directional blocked data formats introduce additional quantization operations on the critical path which can affect the training throughput.

Given how critical quantization is for training large-scale state-of-the-art machine learning models and with the rise of commercial PIM implementations, the techniques described herein showcase how to efficiently perform quantization on emerging PIM implementations, such as the illustrative PIM implementation depicted in FIG. 2. The techniques described herein enable quantizing existing scalar data formats (e.g., BF16) to emerging directional blocked data formats (e.g., MX formats).

Figure 3:
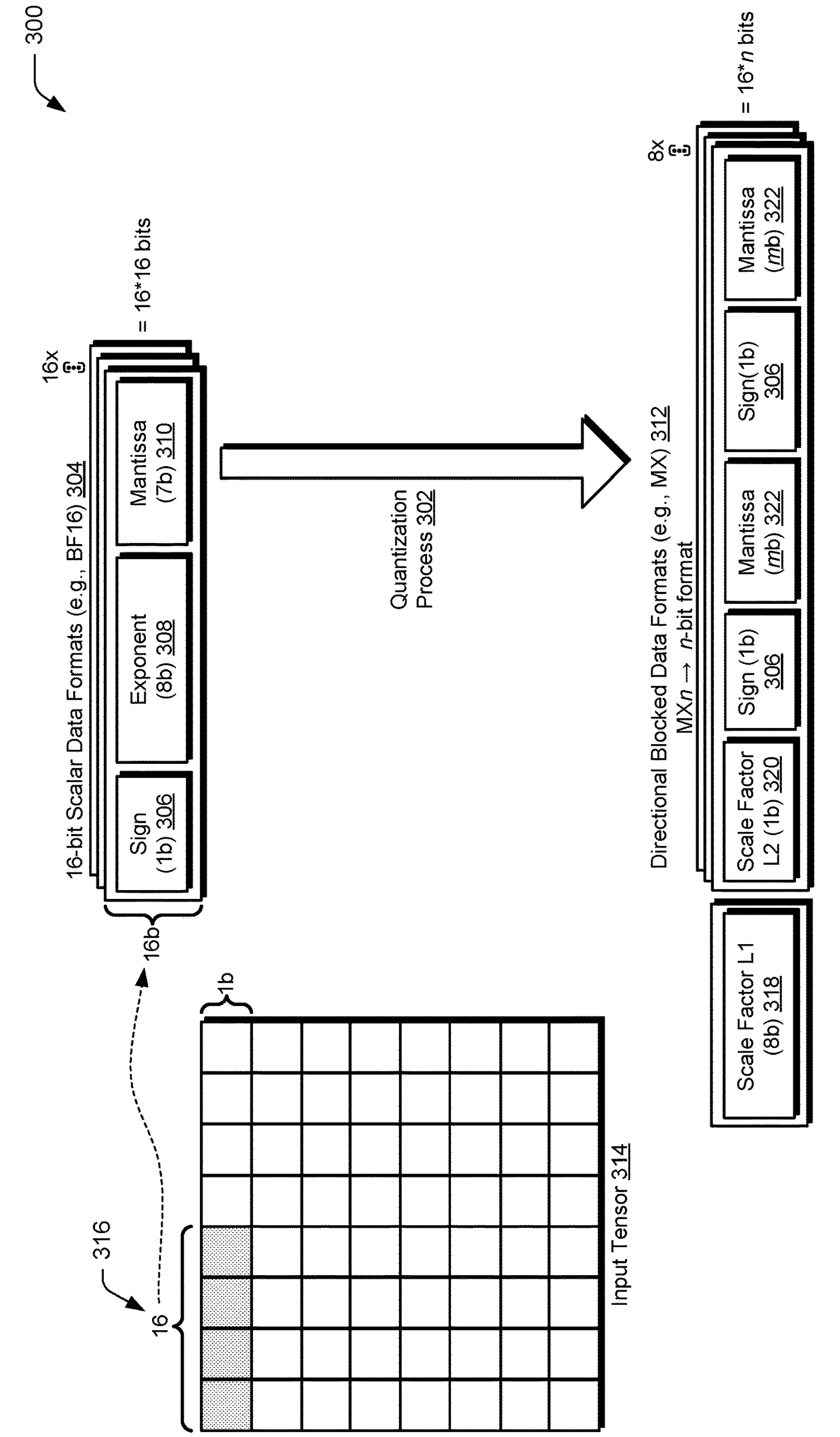
FIG. 3 depicts an example implementation of quantizing scalar data formats into directional blocked data formats.

FIG. 3 depicts an example implementation 300 of quantizing scalar data formats (e.g., BF16) into directional blocked data formats (e.g., MX formats) via a quantization process 302. In the illustrated example, a 16-bit scalar data format 304 is shown having a sign bit 306 (e.g., 1 bit) that indicates a "0" for positive or a "1" for negative. Exponent bits 308 (e.g., 8 bits) represent an exponent in a biased format, determining a scale or magnitude, and allowing for very large and very small values through a specific value bias. Mantissa bits 310 (e.g., 7 bits) represent significant digits.

FIG. 3 depicts how a directional blocked data format 312 breaks an input tensor 314 (i.e., input as a multi-dimensional array of data) into blocks of N input elements 316 (e.g., N=16 BF16 elements in FIG. 3). The quantization process 302 involves computing a shared level-1 scale factor 318 (shown as "Scale Factor L1") using a reduction function (e.g., max) of all exponent bits 308 in the N input elements 316. For example, the max reduction function identifies and returns the maximum value from a set of values (e.g., the exponent bits 308 in the N input elements 316). When applied to the input tensor 314, the reduction function scans the N input elements 316 and outputs the single largest value found. Then, using the shared level-1 scale factor 318, a level-2 scale factor 320 (shown as "Scale Factor L2") is deduced per every two input elements. Finally, the mantissa bits 310 are adjusted using bit-level shift operations to compute an m-bit mantissa 322 per output element.

An efficient implementation of the quantization process 302 is a candidate for PIM acceleration given the significant memory bandwidth boost that a PIM unit (e.g., the PIM hardware unit 104) has over the bandwidth of a host processor (e.g., one or more of the cores 108 of the host 102 or the processor 206). However, with a naïve data mapping and orchestration, emerging commercial PIM implementations are not as efficient in accelerating quantization. This is especially true for directional blocked data formats (e.g., MX).

Returning briefly to FIG. 2, the PIM hardware unit 104 is shown having a PIM ALU 112, which in some implementations is a SIMD ALU. The SIMD width of the PIM ALU 112 matches the output width of the banks 212 (i.e., the width of a DRAM word). For example, with a width of 256 bits and 16-bit inputs, such as shown in FIG. 3, 16 elements can fit in a single DRAM word. A naïve data mapping and orchestration of directional blocked data formats quantization on PIM is challenging as shown in FIG. 4.

Figure 4:
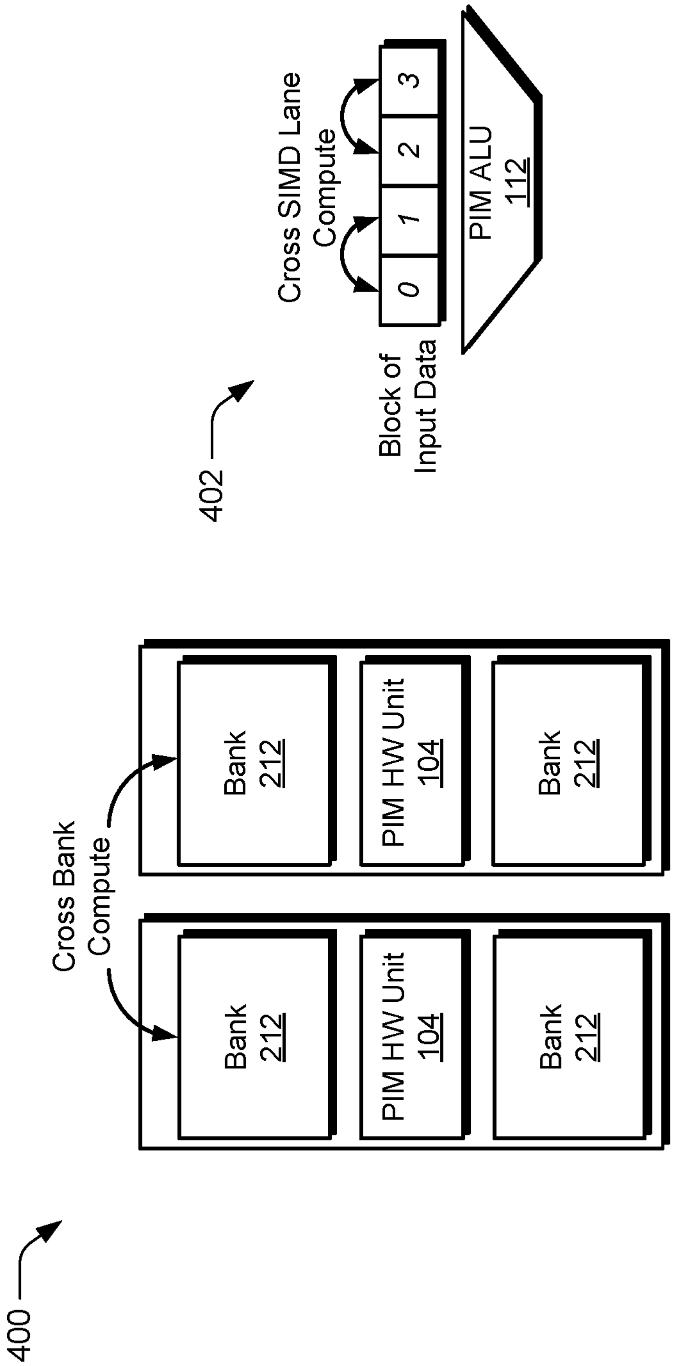
FIG. 4 depicts challenges of naïve mapping for quantization using processing-in-memory.

FIG. 4 depicts the challenges of naïve mapping for quantization using processing-in-memory. FIG. 4 will be described with additional reference to elements introduced in FIGS. 1-3. A naïve mapping divides the input tensor elements of the input tensor 314 among the available PIM ALUs 112 to exploit the inherent parallelism of PIM technology. If elements of the same block (e.g., the input elements 316 of the input tensor 314 in FIG. 3) are in the same bank 212 (or banks 212 sharing the same PIM ALU 112), then the required per-dimension quantization is executed without inter-bank communication. Otherwise, inter-bank communication is required to execute the quantization as shown at 400. Given the absence of an inter-bank communication substrate in the current commercial PIM implementations, this communication is achieved using the host 102 by copying the data (e.g., the unquantized data 114) from one bank 212 to another. This type of communication can be frequent which eliminates any potential benefits from implementing PIM technology.

As discussed above with respect to FIG. 3, the directional blocked data formats 312 utilize input tensors 314 to be quantized along the reduction dimension. Therefore, the overall quantization process 302 involves elements on both row and column dimensions (i.e., in the case of 2D input tensors). A naïve mapping that does not take both row and column dimensions into account would similarly trigger inter-bank communication through the host 102, thus limiting benefits of PIM implementations for quantization.

To compute the scale factors—that is, scale factor level-1 318 and scale factor level-2 320—a reduction operation is performed. For example, the max of exponent values of each input element in the group is calculated. This entails elements in the same block to interact. A naïve mapping that maps a subset of the interacting elements of the block to the same DRAM word, as shown at 402, requires cross SIMD lane compute to compute the quantization. Such cross SIMD lane compute is absent in the current commercial PIM implementations. Subsequently, inter-lane PIM shift commands ("PIM-SHIFT") are used to align the interacting elements which negatively affects the PIM acceleration opportunities.

Figure 5:
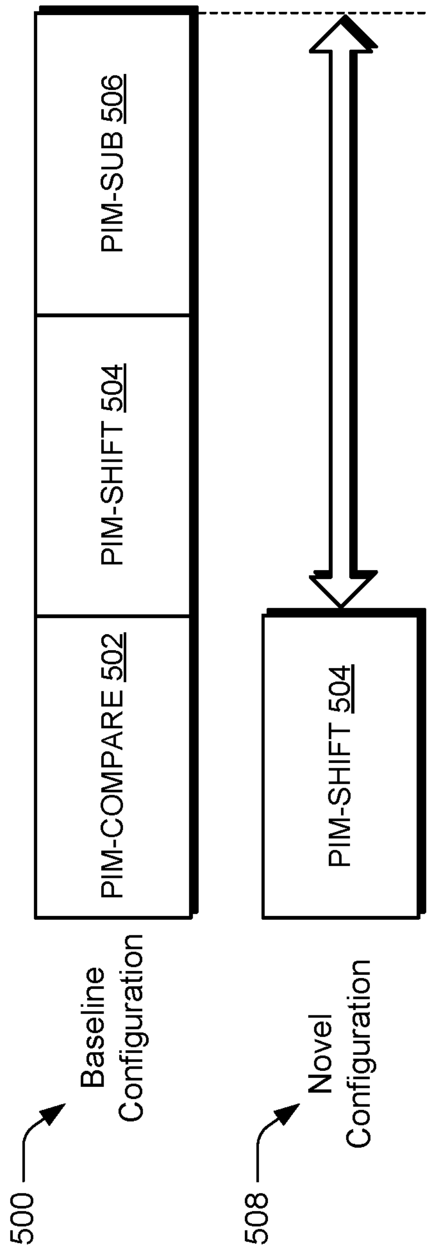
FIG. 5 depicts an example of supporting different shift amounts per lanes in a baseline configuration versus a novel configuration disclosed herein.

As discussed above, the m-bit mantissas 322 in the directional blocked data formats 312 are deduced using bit-level (intra-lane) shift operations. However, in contrast to scalar data format quantization, the shift amount can differ for each input element as it depends on the scale-factor level-2 320 and per-element exponent bit 308 value. This results in using three PIM commands as shown in FIG. 5—labeled as "Baseline Configuration" 500). Specifically, first, using a PIM compare command 502 ("PIM-COMPARE"), check if each lane (i.e., element) wants to shift or not (i.e., shift amount>0) and create a mask to exclude the lane(s) that do not require bit-level shifting. Then, using the mask, issue an intra-lane PIM shift command 504 ("PIM-SHIFT") to shift the target lanes. Finally, using the generated mask, decrement the shift amount for all target lanes using a PIM subtract command 506 ("PIM-SUB"). Given the lower compute capabilities on emerging commercial PIM implementations, especially compared to the available compute of recent and upcoming processors (e.g., CPUs and GPUs), the increase in PIM compute commands to process will be a bottleneck to accelerate quantization on PIM. The aforementioned challenges exist and can potentially increase for other MX-like formats with different block sizes or higher dimension (e.g., 2D, 3D) blocked data formats (as opposed to 1D blocked MX formats).

The described techniques include methodologies and mechanisms to enable efficient acceleration of quantization on PIM hardware, such as the PIM hardware units 104 described above, by addressing the challenges discussed above. To this end, the described techniques provide a methodology of data-mapping for quantization to be able to exploit the benefits provided by emerging PIM commercial implementations. The described techniques also provide a methodology and apparatus to lower PIM compute operations that are used to execute quantization.

Figure 6:
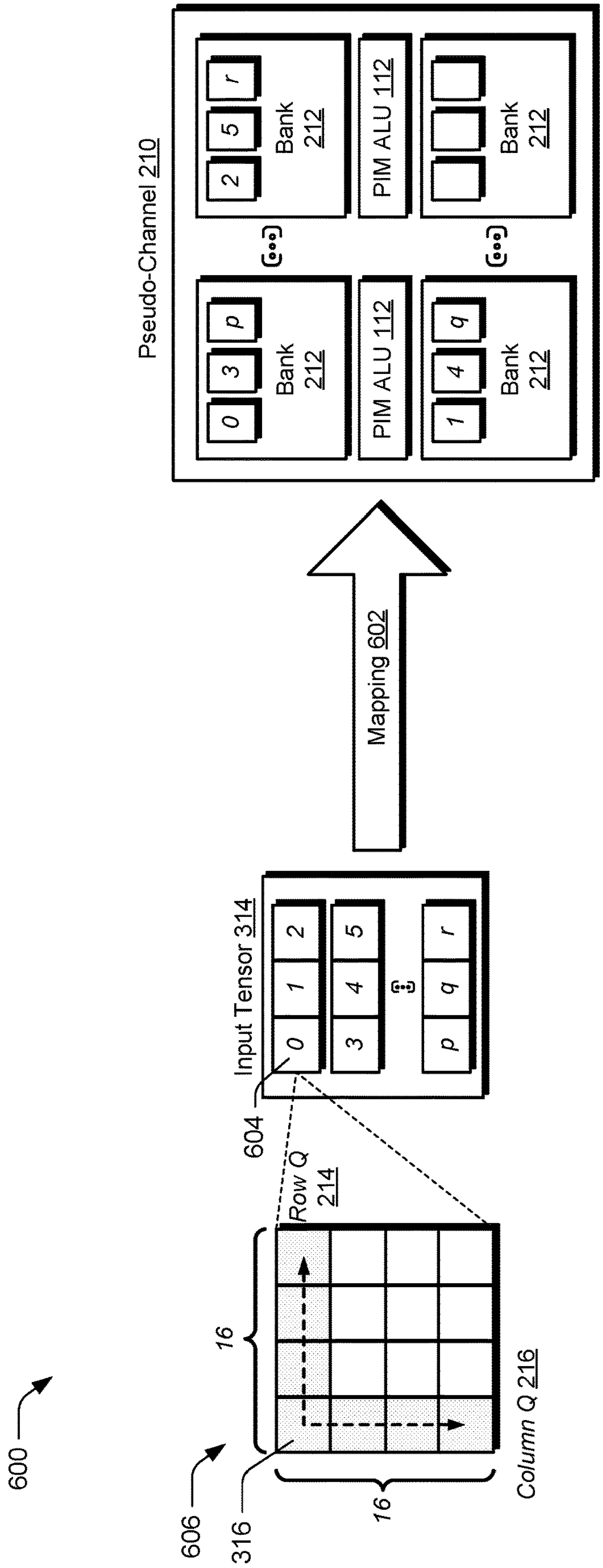
FIG. 6 depicts an example of data mapping for quantization of directional blocked data formats on processing-in-memory arithmetic logic units.

One challenge to harness PIM technology for quantization is to map the unquantized input elements efficiently. The described techniques achieve this using a data-mapping methodology. FIG. 6 depicts an example 600 of data mapping 602 for the quantization of directional blocked data formats 126 on PIM ALUs 112. To avoid the need for inter-bank communication, the unquantized data 114 is placed in the PIM memory circuit 110 such that the unquantized data 114 are mapped to the same PIM ALU 112. In consideration of this, the described techniques implement the mapping 602 tailored to quantization of directional blocked data formats 126 (e.g., MX formats). Specifically, to support both row 214 and column 216 quantization for the directional blocked data formats 126, the described techniques implement the mapping 602 in which the tile 604 of the input tensor 314 is mapped to a single PIM ALU 112. The input elements 316 per tile 604 are mapped in a row-major fashion, although the techniques described herein are also applicable to the input elements 316 per tile 604 mapped in a column-major fashion. The tile 604 size and/or shape is/are dependent on the number of input elements 316 in the group to be quantized (shown generally as 606). For example, in FIG. 3, "16" input elements 316 are quantized as a single block, making the tile size 16×16.

To utilize all of the PIM ALUs 112 in parallel and unlock full potential of PIM technology, multiple independent tiles 604 are processed in different PIM ALUs 112. The sizes of the input tensors 314 in state-of-the-art models ensures having large number of tiles 604 to exploit all available PIM ALUs 112.

Figure 7:
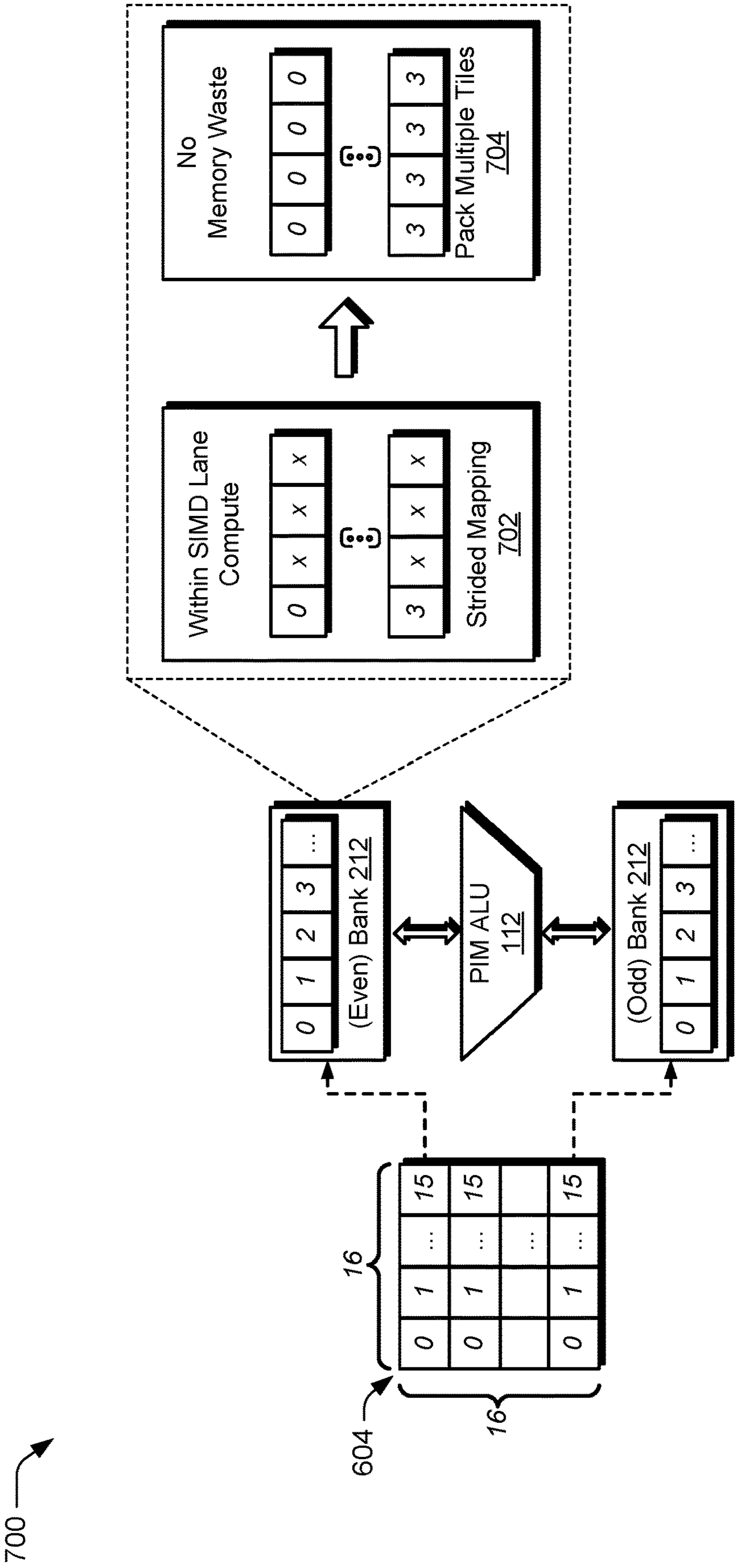
FIG. 7 depicts an example of mapping a tile on a processing-in-memory hardware unit to eliminate cross single instruction, multiple data compute and to reduce row activations.

FIG. 7 depicts an example 700 of mapping a tile 604 on a PIM ALU 112 to eliminate cross SIMD compute and to reduce row activations. To avoid the cross SIMD lane computations required to compute the scale factors 318, 320 (level-1, level-2), a strided mapping 702 to map the input elements 316 of the same tile 604 to the same SIMD lane (i.e., same lane in different DRAM words). This ensures that the input elements 316 of the same tile 604 are always aligned and therefore cross lane computations or PIM lane shift commands are not needed. Overhead is incurred by column quantization as the tile 604 is mapped in a row-major fashion. If the tile 604 is mapped in in a column-major fashion, then the overhead is incurred by row quantization. To reduce overhead when computing quantization on the PIM ALU 112, the tile 604 is spread over the banks 212 sharing the PIM ALU 112.

The strided mapping 702 addresses the SIMD lane alignment issue but results in low utilization of the PIM ALU 112 because one out of N lanes is utilized and results in memory waste. To address this waste, the described techniques also pack input elements 316 from independent tiles 604 in the same DRAM word as shown at 704 in FIG. 7. By packing multiple tiles 704, utilization of the PIM ALU 112 is maximized and ensures zero memory waste.

To alleviate the PIM compute bottleneck when accelerating quantization of directional blocked data formats 126, optimizations which lower the number of PIM commands to perform the intra-lane, bit-level, shifts per tile are needed to improve quantization performance on PIM hardware. Therefore, the described techniques implement a methodology and apparatus to lower PIM compute operations.

Figure 8:
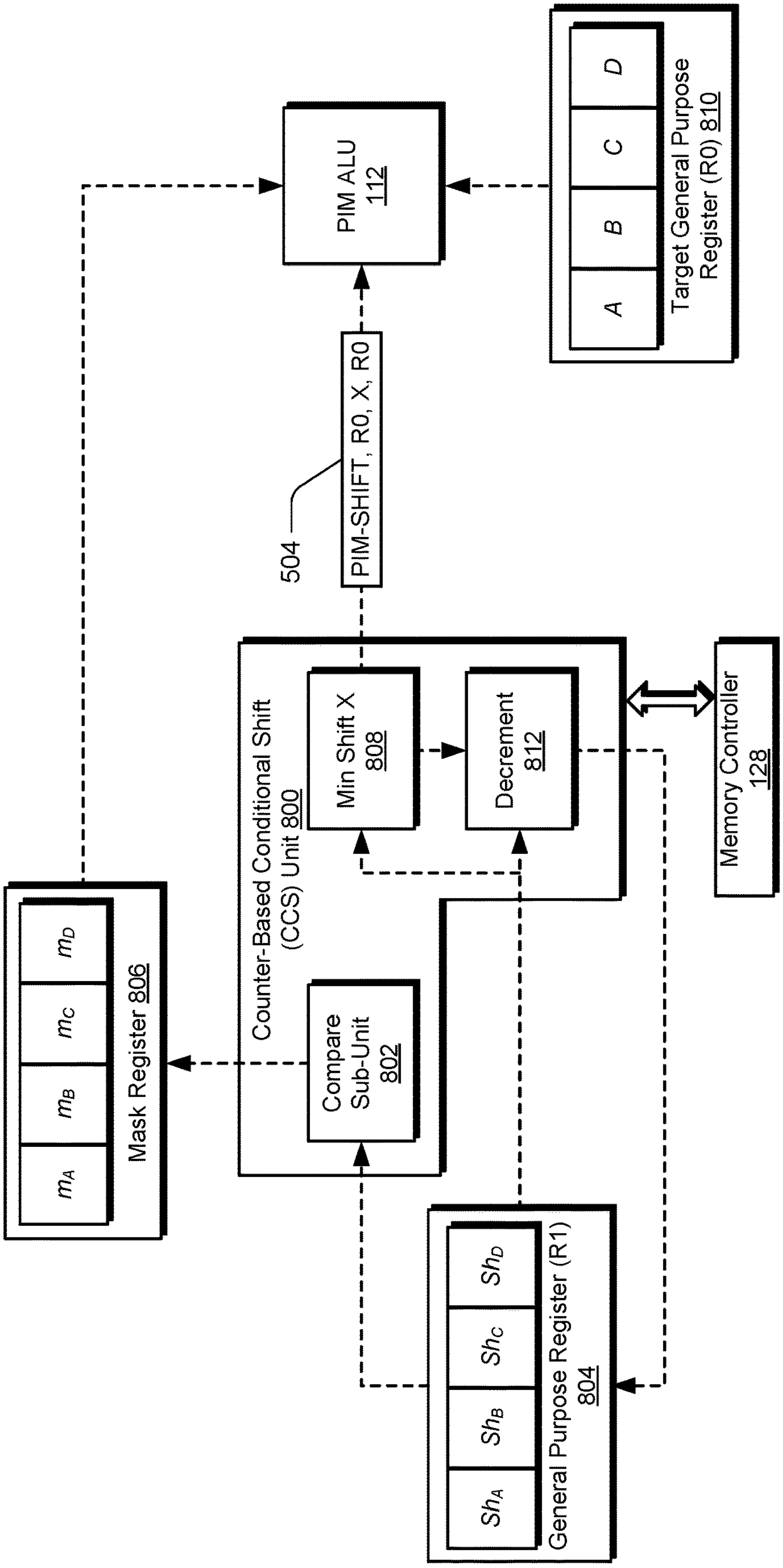
FIG. 8 depicts an example implementation of a counter-based conditional shift unit configured to lower processing-in-memory compute operations.

As shown in FIG. 5, the described techniques augment the PIM ALU 112 to reduce the number of PIM commands required from three in the baseline configuration 500 (i.e., a PIM compare command 502, a PIM shift command 504, and a PIM subtract command 506) to one in the novel configuration 508 (i.e., a single intra-lane PIM shift command 504). This is accomplished using a counter-based conditional shift, or CCS unit 800, an example of which is depicted in FIG. 8, which will be described in detail below. The CCS unit 800 coordinates the compare mask generation and updating the per-lane shift amounts. The CCS unit 800, in one or more implementations, is a sub-circuit of the PIM hardware unit 104. For example, the CCS unit 800 is implemented as part of the PIM hardware unit 104 but separate from the PIM ALU 112. Alternatively, the CCS unit 800 is implemented as part of the PIM ALU 112. In other implementations, the CCS unit 800 is implemented separately from PIM hardware unit 104, such as a standalone circuit of the system 100.

FIG. 8 depicts an example implementation of a CCS circuit 800 (shown as "CCS unit") configured to lower PIM compute operations. On receiving an intra-lane PIM SHIFT command 504, a compare sub-unit circuit 802 (shown as "compare sub-unit") checks a per-lane shift amount $S_i$, which is stored in a general purpose register 804. Based on the shift amounts, the compare sub-unit circuit 802 generates a mask register 806 to exclude the lanes that do not require bit-level shifting (i.e., lanes with $S_i=0$). Using the mask register 806, a minimum shift amount 808 (denoted as "X" in FIG. 8) is calculated across the lanes to opportunistically coalesce the required intra-lane shifts. Using the minimum shift amount 808, the intra-lane PIM SHIFT command 504 is updated and sent to the PIM ALU 112 to perform X-bit shifts on a target general purpose register 810 (R0 in this example). Concurrently, the minimum shift amount 808 ("X") is used to decrement 812 the shift amounts of all unmasked lanes. Once all lanes are shifted by the required shift amount (i.e., $S_i=0$ for all lanes), the CCS unit 800 informs the memory controller circuit 128 so that the memory controller circuit 128 stops issuing intra-lane PIM shift commands 504 to the PIM ALU 112. Additionally, once all PIM ALUs 112 (e.g., managed by the same memory controller circuit 128) complete bit-level shifting, then the memory controller circuit 128 informs the host 102 to send the next (non-shift) PIM command in the quantization PIM routine. This opportunistic shift coalescing results in fewer intra-lane PIM shift commands 504 compared to a scenario that is using the CCS unit 800 without coalescing support, such as illustrated and described below with reference to FIG. 9.

Figure 9:
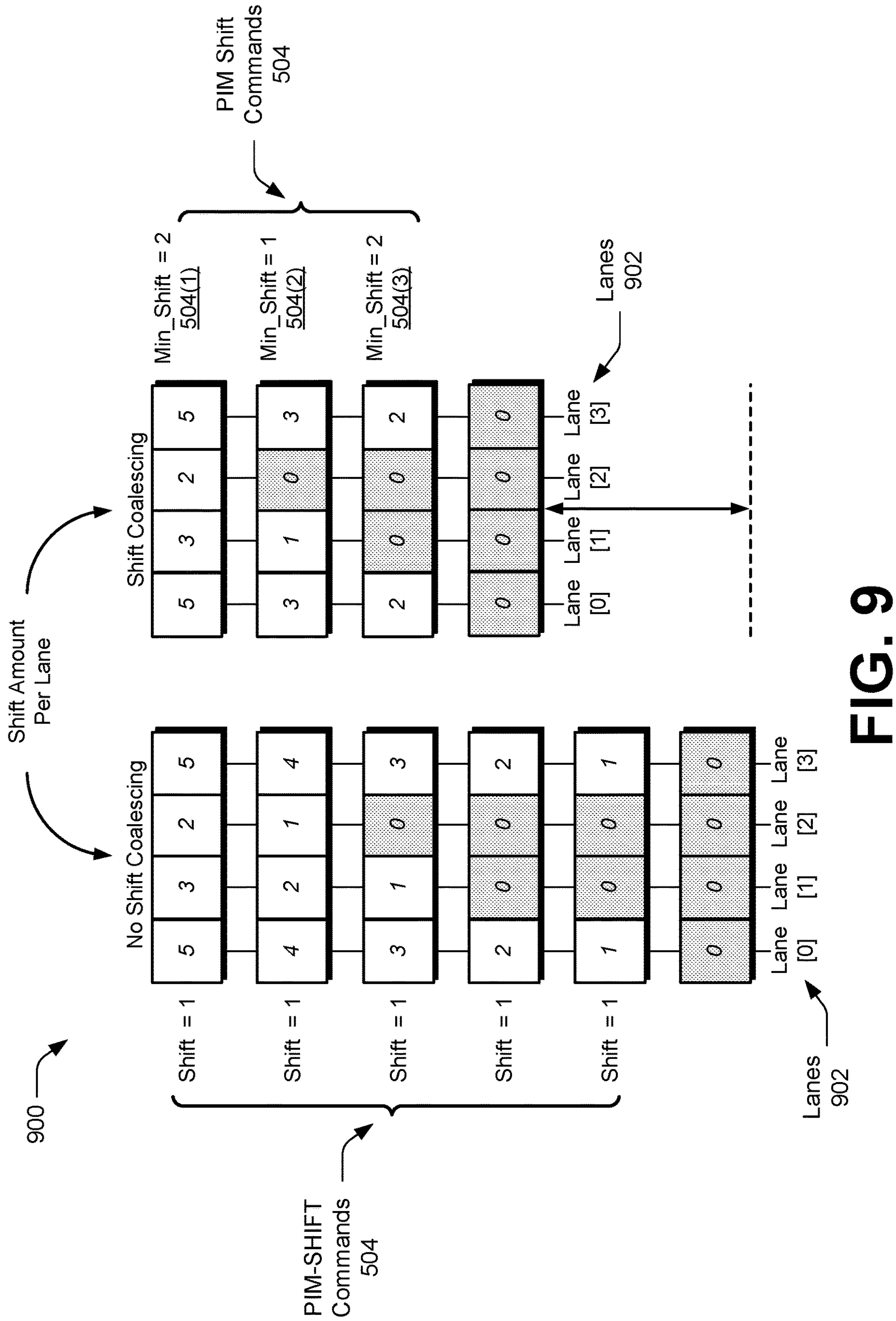
FIG. 9 depicts an example of opportunistic shift coalescing performed by the counter-based conditional shift unit.

FIG. 9 depicts an example 900 of opportunistic shift coalescing performed by the CCS unit 800. The illustrated example 900 assumes four lanes 902 (lane[0], lane[1], lane[2], lane[3]) with shift amounts "5," "3," "2," and "5," respectively. Instead of sending five intra-lane shift commands 504 each performing a single-bit shift when no shift coalescing is used, the CCS unit 800 enables three intra-lane shift commands 504 when shift coalescing is used. Specifically, with shift coalescing, a first intra-lane PIM shift command 504(1) performs a 2-bit shift as the least shift amount across the four lanes 902 is "2" (lane[2]). After this shift command 504, the lanes 902 shift amount will be 3, 1, 0, and 3. Therefore, lane[2] is masked to stop any further shifts. Then, a second intra-lane PIM shift command 504(2) performs a 1-bit shift as the least shift amount is one (lane[1]). This will result in the lanes shift amount to be "2," "0," "0," and "2." Therefore, lane[1] is now also masked. Finally, a third/last intra-lane PIM shift command 504(3) performs a 2-bit shift as the least shift amount in lanes 0 and 3 is "2." This results in all lanes 902 shift amount to be "0."

Figure 10:
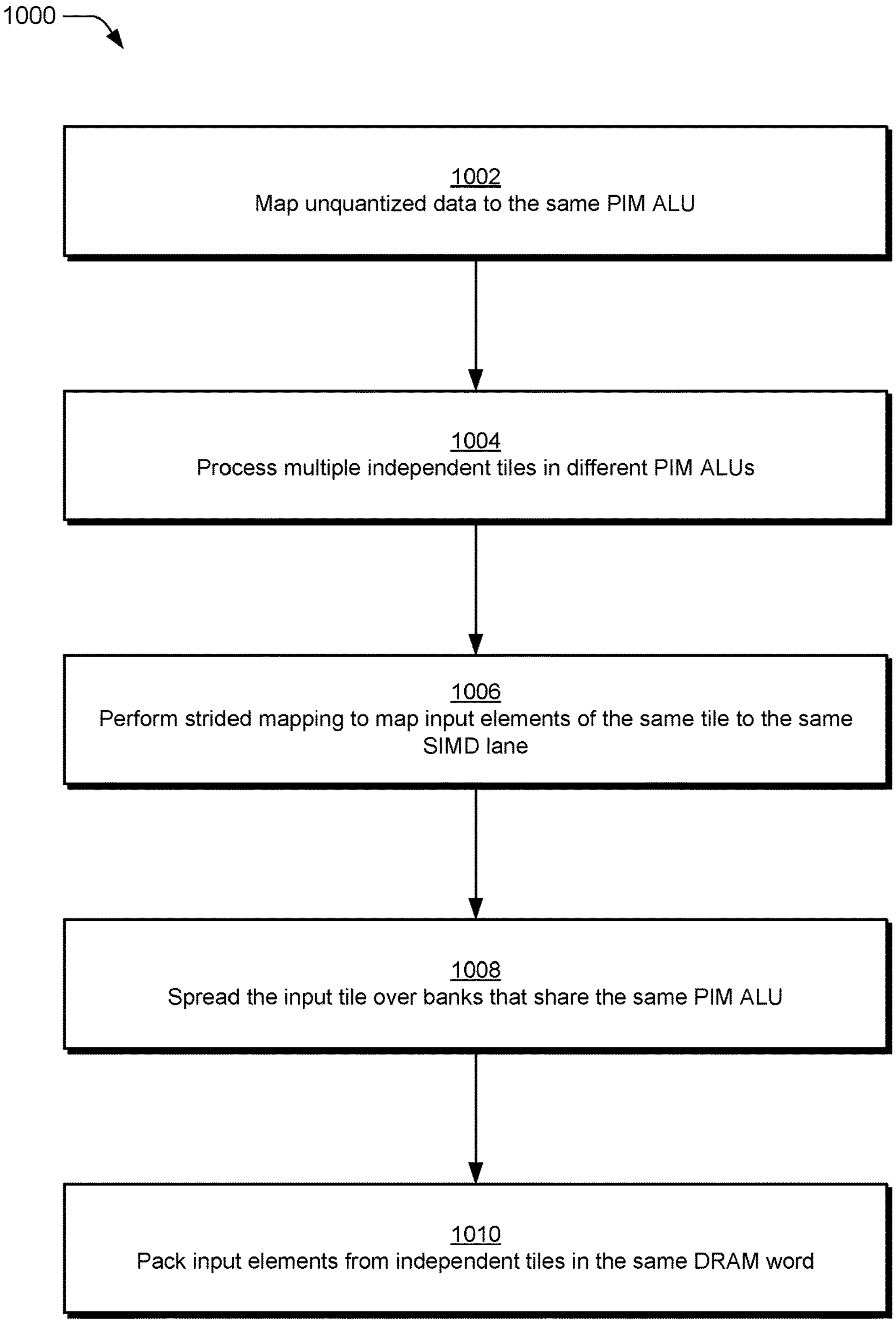
FIG. 10 depicts an example procedure for data mapping unquantized input elements to a processing-in-memory hardware unit for quantization.

FIG. 10 depicts an example procedure 1000 for data mapping unquantized input elements to a PIM hardware unit for quantization. The order in which the procedure 1000 is described is not intended to be construed as a limitation, and any number or combination of the described procedure operations may be performed in any order to perform a procedure, or an alternate procedure.

At 1002, the memory controller circuit 128 maps the unquantized data 114 to the same PIM ALU 112 for quantization. In one or more implementations, a tiled data mapping 602 approach as depicted in FIG. 6 is used by the memory controller circuit 128 to map input elements 316 per tile 604 in a row-major fashion. In particular, the memory controller circuit 128 divides the input tensor 314 into multiple tiles 604 and then maps each tile 604 to a single PIM ALU 112. For example, if quantizing "16" input elements 316 as a block (i.e., as shown in FIG. 3), the tile 604 size is 16×16.

At 1004, different PIM ALUs 112 simultaneously process multiple independent tiles 604. Utilizing multiple PIM ALUs 112, and in some cases, all available PIM ALUs 112, in parallel, maximizes the potential of PIM technology for quantization. For example, some modern machine learning models utilize tensors that provide a number of tiles that is sufficient to effectively utilize all available PIM ALUs 112. Other machine learning models may utilize multiple but not all PIM ALUs 112.

At 1006, the memory controller circuit 128 performs strided mapping to map the input elements 316 of the same tile 604 to the same SIMD lane. This avoids cross SIMD lane computations for scale factor computation. This alignment ensures that the input elements 316 of the same tile 604 are aligned, negating the need for cross-lane computations or PIM lane shift commands.

At 1008, the memory controller circuit 128 ensures that the input tile 604 is spread over the banks 212 that share the same PIM ALU 112. In this manner, row activations are minimized during column quantization. An example of this approach is depicted in FIG. 7, where the tile 604 is spread between even and odd banks 212 that share the same PIM ALU 112.

At 1010, the memory controller circuit 128 packs input elements 316 from independent tiles 604 in the same DRAM word to address the inefficiency and memory waste results from the strided mapping process performed at 1006. This maximizes utilization of the PIM ALU 112 and eliminates memory waste. FIG. 7 illustrates an example of packing multiple tiles 704.

The procedure 1000 leverages the capabilities of PIM architectures, such as depicted in FIGS. 1 and 2, to efficiently process and quantize large datasets in memory, reducing latency and enhancing overall performance.

Figure 11:
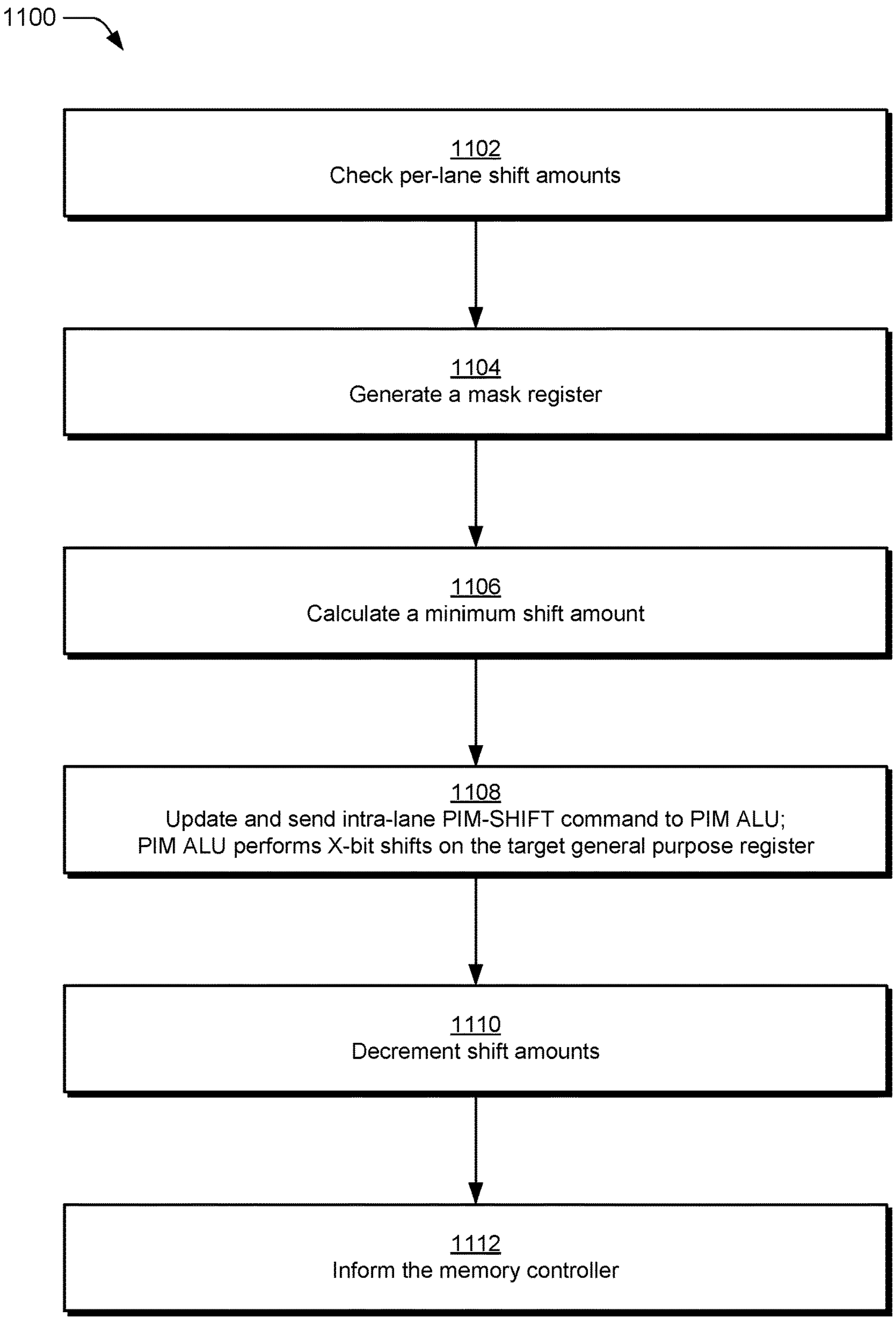
FIG. 11 depicts an example procedure for reducing the number of processing-in-memory commands to alleviate processing-in-memory bottleneck when accelerating quantization of directional blocked data formats.

FIG. 11 depicts an example procedure 1100 for reducing the number of processing-in-memory commands to alleviate processing-in-memory bottleneck when accelerating quantization of directional blocked data formats. The order in which the procedure 1100 is described is not intended to be construed as a limitation, and any number or combination of the described procedure operations may be performed in any order to perform a procedure, or an alternate procedure.

At 1102, the CCS unit 800 checks the per-lane shift amounts. For example, upon receiving an intra-lane PIM shift command, the CCS unit 800 uses the compare sub-unit 802 to check the shift amount ($S_i$) for each lane. These shift amounts are stored in a general purpose register 804 (R1 in FIG. 8).

At 1104, the CCS unit 800 generates the mask register 806 based on the shift amounts. The mask register 806 is used to exclude lanes that do not require bit-level shifting (i.e., lanes with $S_i$=0).

At 1106, the CCS unit 800 uses the generated mask to calculate the minimum shift amount ("X") 808 across the lanes. This is done to coalesce intra-lane shifts opportunistically.

At 1108, the CCS unit 800 updates the intra-lane PIM shift command 504 using the minimum shift amount 808. Also at 1108, the CCS unit 800 sends the updated intra-lane PIM shift command 504 to the PIM ALU 112. The PIM ALU 112 performs X-bit shifts on the target general purpose register 810 (e.g., R0 in FIG. 8).

At 1110, the CCS unit 800 decrements the shift amounts. In particular, the CCS unit 800 concurrently uses the minimum shift amount 808 to decrement the shift amounts of all unmasked lanes. This process is repeated until all lanes are shifted by the required amount (i.e., $S_i$=0) for all lanes.

At 1112, the CCS unit 800 informs the memory controller circuit 128. In particular, once all lanes are shifted as required, the CCS unit 800 informs the memory controller circuit 128 to stop issuing intra-lane shift commands 504 to the PIM ALU 112. When all PIM ALUs 112 under the same memory controller circuit 128 complete bit-level shifting, the memory controller circuit 128 informs the host 102 to proceed with the next (non-shift) PIM command in the quantization process.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein, including, where appropriate, the host 102, the PIM hardware unit 104, interface 106, the core 108, the PIM memory circuit 110, the PIM ALU 112, the memory controller circuit 128, the scheduling system 130, the DRAM die 202, the logic die 204, the processor 206, the interposer 208, the pseudo-channel 210, the banks 212, the decoders 218, the row buffers 220, the CCS unit 800, the compare sub-unit 802, the general purpose register 804, the mask register 806, the target general purpose register 810, any combination thereof, and/or other functional units described herein are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

What is claimed is:

1. A system comprising:
- a processing-in-memory (PIM) hardware unit comprising a PIM memory circuit, a at least one PIM arithmetic logic unit, and a counter-based conditional shift circuit;
- the PIM memory circuit configured to store data;
- a memory controller circuit configured to map the data to the PIM memory circuit; and
- the at least one PIM arithmetic logic unit configured to quantize the data from a scalar format to a directional blocked data format.

2. The system of claim 1, wherein the data includes unquantized data or previously quantized data.

3. The system of claim 1, wherein the PIM memory circuit includes one or more memory banks shared by the at least one PIM arithmetic logic unit.

4. The system of claim 3, wherein the memory controller circuit is configured to spread the data over the one or more memory banks.

5. The system of claim 1, wherein the scalar format is BF16 and the directional blocked data format is a microscaling format.

6. The system of claim 1, wherein the data is configured as an input tensor including a plurality of tiles.

7. The system of claim 6, further comprising a plurality of PIM arithmetic logic units including the at least one PIM arithmetic logic unit, and one or more PIM arithmetic logic units of the plurality of PIM arithmetic logic units are configured to process one or more tiles of the plurality of tiles included in the input tensor.

8. The system of claim 6, wherein the memory controller circuit is configured to map input elements of a specific tile of the plurality of tiles to a specific single instruction, multiple data lane of the at least one PIM arithmetic logic unit or a specific column of a dynamic random-access memory word of a memory bank of the PIM memory circuit.

9. The system of claim 8, wherein the memory controller circuit is further configured to pack multiple tiles of the plurality of tiles into one or more dynamic random-access memory words within one or more memory banks shared by one or more PIM arithmetic logic units of a plurality of PIM arithmetic logic units.

10. The system of claim 1, wherein the counter-based conditional shift circuit is configured to lower a number of processing-in-memory compute operations.

11. The system of claim 1, wherein the counter-based conditional shift circuit is configured to:
- check a shift amount for each lane in the PIM arithmetic logic unit;
- based on the shift amount for each lane, generate a mask register;
- using the mask register, calculate a minimum shift amount;
- update an intra-lane shift command to include the minimum shift amount; and
- decrement the shift amount for each lane by the minimum shift amount.

12. A system comprising:
- a counter-based conditional shift circuit configured to:
  - check a shift amount for each lane in an arithmetic logic unit;
  - based on the shift amount for each lane, generate a mask register;
  - using the mask register, calculate a minimum shift amount;
  - update an intra-lane shift command to include the minimum shift amount; and
  - decrement the shift amount for each lane by the minimum shift amount.

13. The system of claim 12, further comprising the arithmetic logic unit, and wherein the arithmetic logic unit is configured to perform intra-lane shifts when instructed via the intra-lane shift command.

14. The system of claim 13, wherein the counter-based conditional shift circuit is further configured to inform a memory controller circuit that all lanes have been shifted and to instruct the memory controller circuit to stop issuing intra-lane shift commands to the arithmetic logic unit.

15. The system of claim 14, further comprising the memory controller circuit.

16. A method comprising:
- mapping data to a memory circuit of a processor-in-memory (PIM) hardware unit, wherein the PIM hardware unit includes a PIM memory circuit, different arithmetic logic units, and a counter-based conditional shift circuit;
- processing multiple independent tiles in parallel in different arithmetic logic units of the PIM hardware unit;
- perform strided mapping to align elements of a specific tile to a specific lane within a specific arithmetic logic unit;
- spreading the specific tile over multiple memory banks of the memory circuit that share the specific arithmetic logic unit; and
- packing elements from the multiple independent tiles in one or more dynamic random-access memory words.

17. The method of claim 16, wherein the data is formatted in a scalar format.

18. The method of claim 17, wherein the scalar format is BF16.

19. The method of claim 17, further comprising outputting quantized data formatted in a directional blocked data format.

20. The method of claim 16, wherein the counter-based conditional shift circuit is configured to perform operations comprising:
- checking a shift amount for each lane in the specific arithmetic logic unit;
- based on the shift amount for each lane, generating a mask register;
- using the mask register, calculating a minimum shift amount;
- updating an intra-lane shift command to include the minimum shift amount; and
- decrementing the shift amount for each lane by the minimum shift amount.

* * * * *